UNITED STATES PATENT OFFICE.

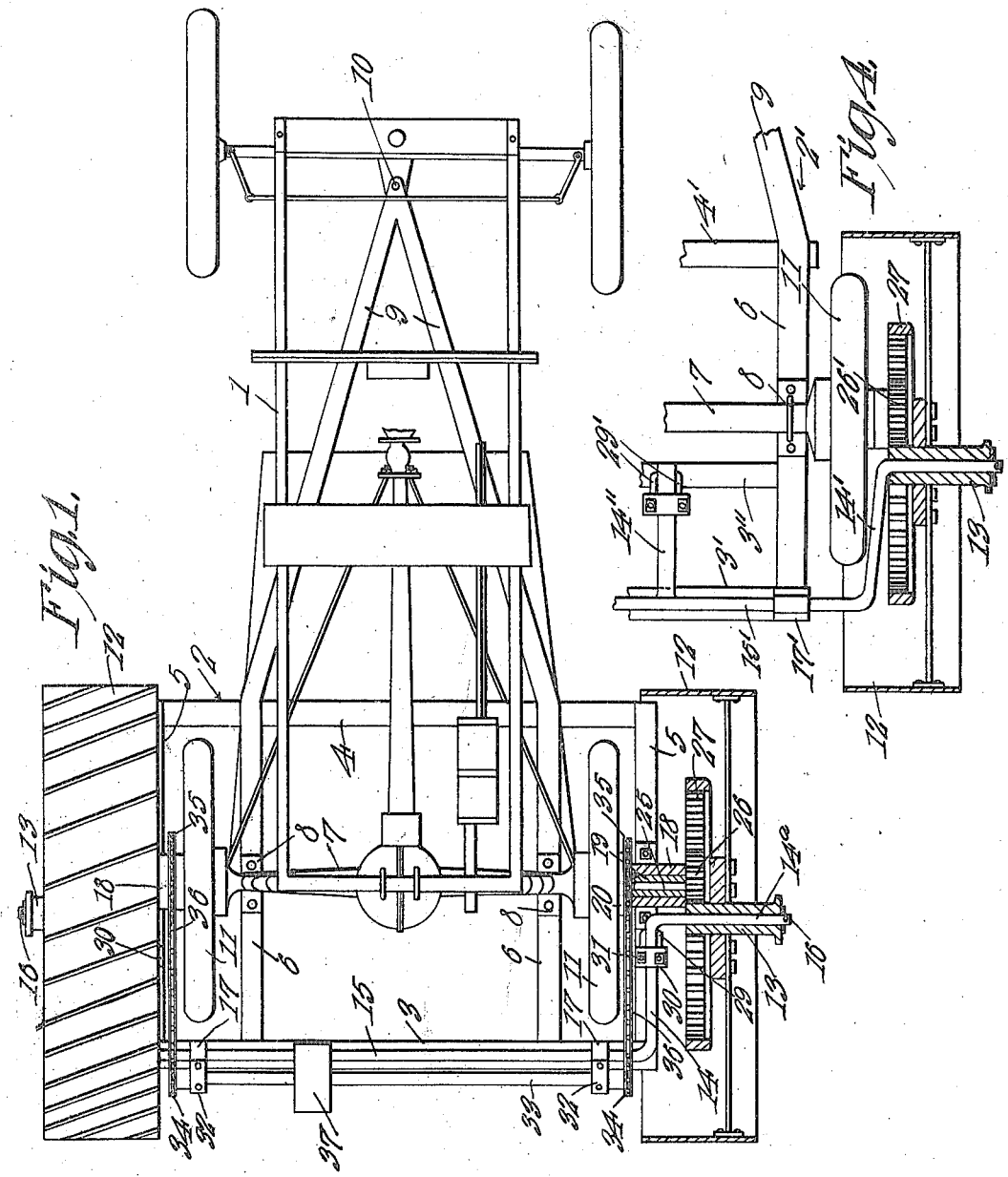

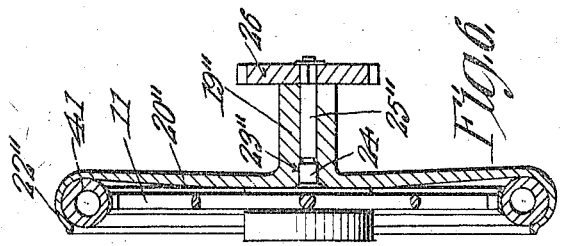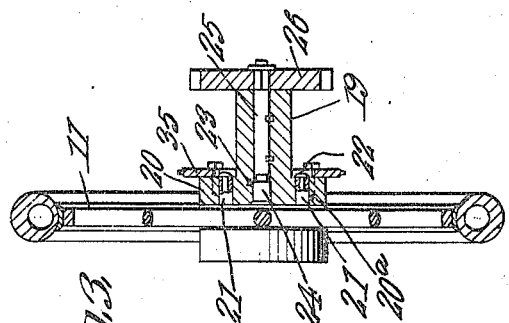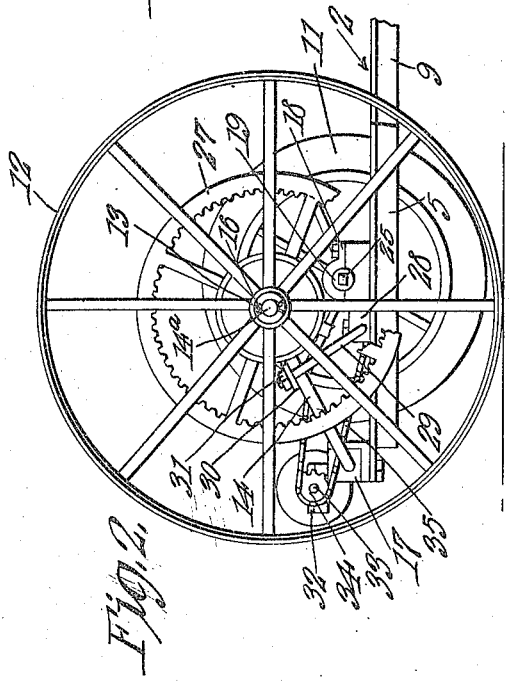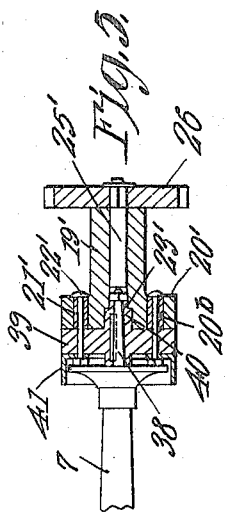

CHARLES L. OLMSTEAD, OF GREAT FALLS, MONTANA.

TRACTOR ATTACHMENT FOR AUTOMOBILES.

1,234,074.

Specification of Letters Patent.

Patented July 17, 1917.

Application filed June 3, 1916. Serial No. 101,587.

*To all whom it may concern:*

Be it known that I, CHARLES L. OLMSTEAD, a citizen of the United States, residing at Great Falls, in the county of Cascade and State of Montana, have invented a new and useful Tractor Attachment for Automobiles, of which the following is a specification.

The present invention is an attachment for an automobile, for the purpose of converting the automobile into a tractor for doing heavy pulling, and it is the object of the invention to provide a novel and improved contrivance of that nature.

As a more specific object, the invention aims to provide a tractor attachment for automobiles embodying a frame for supporting the rear axle housing of an automobile chassis, traction wheels adjustably connected with said frame, and means for operatively connecting said traction wheels and the rear axle of the automobile chassis.

It is also the object of the invention to provide a device of the character specified, which is comparatively simple in construction, which can be used with various automobiles, which can be readily applied to and detached from an automobile, and which will be thoroughly practical and efficacious in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of the device applied to an automobile chassis, portions being shown in section.

Fig. 2 is a fragmental side elevation.

Fig. 3 is an enlarged sectional detail showing the manner of attaching one pinion to the rear wheel of the automobile chassis.

Fig. 4 is a fragmental plan view showing a modification.

Fig. 5 is a sectional detail showing a modified means of attaching the pinion to the rear axle.

Fig. 6 is a sectional view showing another modification for connecting the pinion with the rear wheel.

In the drawings, there is illustrated an automobile chassis 1 with the body removed, although this is not necessary when using the present attachment. The attachment embodies a frame 2 constructed of angle iron or other suitable stock, and embodying a rear cross piece 3, an intermediate cross piece 4, longitudinal side members 5 attached to the ends of the cross pieces, intermediate longitudinal members 6 secured to the cross pieces and having forwardly projecting converging portions 9 whose forward ends are connected together, and pivotally or otherwise connected, as at 10, to the front axle of the chassis 1. This serves to steady the chassis 1 and frame 2 relative to one another. The rear axle housing 7 of the chassis rests upon the members 6, any suitable means 8 being used for holding the housing 7 upon the members 6. The rear wheels 11 of the chassis are disposed between the cross pieces and between the members 5 and 6, and are supported above the ground by the frame 2 which carries the rear axle housing and accompanying parts of the chassis. The front wheels of the chassis, however, run on the ground and serve their usual office of steering the machine.

The attachment includes a pair of traction wheels 12 of any suitable construction and of larger diameter than the automobile wheels 11, the hubs 13 of said wheels 12 being journaled for rotation upon the angularly extending terminals 14$^a$ of the crank arms 14 of an arched axle 15. The hubs 13 are retained upon the terminals 14$^a$ by means of cotter pins 16 or other suitable retaining elements. The axle 15 is journaled in pillow blocks or bearings 17 secured upon the cross piece 3 of the frame 2, and the crank arms 14 project forwardly and upwardly, whereby the rear portion of the frame 2 is hung from the traction wheels 12, while the forward portion of the frame 2 is attached to the front axle of the chassis. Means are provided, as hereinafter will more fully appear, for holding the axle 15 and frame 2 in different relative positions.

The means for operatively connecting the rear axle of the chassis and the traction wheels 12, embodies pillow blocks 18 secured upon the members 5, and stub shafts 19 journaled within the pillow blocks 18 and provided at those ends adjacent the wheels 11 with flanges 20 having apertures 20$^a$ receiving tubular members 21 which are fastened by bolts 22 with the wheel 11. These bolts 22 are the same as ordinary bolts used, excepting they are longer to extend through the flanges 20. The stub shafts 19 have recesses 23 for receiving the hubs 24 of the wheels 11, and spindles 25 are keyed or otherwise secured within the tubular shafts 19 and have pinions 26 removably secured upon their protruding terminals. These pinions 26 are disposed within internal gears 27 of relatively large diameter secured to the hubs of the traction wheels 12 upon the inner sides of the spokes. These gears 27 can be secured in any suitable manner to the traction wheels, whereby the necessary strength is afforded. The pinions 26 are thus attached to the terminals of the rear axle and mesh with the internal gears 27 attached to the traction wheels, whereby the traction wheels are rotated at a slower velocity than the rear wheels 11 of the chassis, to provide for increased pulling power.

The means for adjustably connecting the axle 15 and frame 2 embody rearwardly projecting extensions 28 of the pillow blocks 18, and U-shaped clevises 29 having their bends pivotally engaging through the extensions 28 and having their stems straddling the arms 14 from below. Bars 30 are slidably engaged upon the limbs of the clevises and seat upon the crank arms 14, and nuts 31 are threaded upon the ends of the clevises. The clevises thus connect the crank arms 14 and members 5, to limit the separation of said members, whereby the frame 2 will be hung at a proper distance below the axis of the traction wheels 12. By loosening the nuts 31, the crank arms 14 can swing away from the frame 2, thus to permit the frame 2 to move downwardly farther, and by screwing the nuts farther upon the clevises, the frame 2 will be raised. This adjustment of the axle 15 relative to the frame 2, enables the pinions 26 and gears 27 of different diameters to be used, to vary the ratio of rotation between the wheels 11 and 12.

In order that the automobile can also be used as a stationary power plant, a transverse jack shaft 33 is journaled in bearings 32 carried by the pillow blocks 17 in rear of the axle 15, and is connected to the rear axle of the chassis. Thus, sprocket wheels 34 are secured to the ends of the jack shaft 33 and are connected by endless sprocket chains 36 with sprocket wheels 35 bolted or otherwise attached to the flanges 20. The shaft 33 has a pulley wheel 37 or other means for transmitting motion to a churn, electric generator, or other machine. When the machine is used as a tractor, the sprocket chains 36 are removed, and when the machine is used as a power plant, the pinions 26 are removed.

The attachment can be readily applied to and detached from the chassis, and when applied provides a tractor which can be used for pulling heavy loads, since the wheels 12 are rotated at a slow speed compared with the rotation of the wheels 11.

In the modification illustrated in Fig. 4, the members 5 are eliminated, and the cross pieces 3' and 4' of the frame 2' are cut off adjacent each member 6, as seen in Fig. 4. The frame 2' has an additional cross piece 3'', and the pinion 26' at each side is attached directly to the rear wheel 11. The crank arm 14' at each side is disconnected from the frame 2', but the axle 15' has one or more arms 14'' projecting over the cross piece 3'', and each arm 14'' is connected to the cross piece 3'' by a clevis 29', in the same manner in which the crank arms 14 are connected with the members 5, as above described.

Fig. 5 shows a modified means for attaching the pinion 26 to the rear axle, the spindle of which is indicated at 38 in Fig. 5. A disk 39 has a hub 40 fitted upon the spindle 38 and keyed or otherwise secured thereto to rotate with the rear axle, and a tubular stub shaft 19' has a flange 20' provided with apertures 20$^b$ receiving tubular members 21' secured to the disk 39 by means of bolts 22', said bolts also securing the brake drum 41 to the disk or member 39. The shaft 19' has a recess 23' for receiving the hub 40, and a spindle 25' is carried by the shaft 19' for carrying the pinion 26.

Fig. 6 illustrates another means for attaching the pinion 26 to the rear wheel 11. In this modification, a disk 20'' fits against the outer side of the wheel 11 and is provided with a marginal concaved flange 22'' which can be slipped over the pneumatic tire 41 of the wheel 11 when said tire is deflated, in order that when the tire is again inflated, it will fit tightly within the flange 22'', thus causing the disk 20'' to rotate with the wheel 11. The disk 20'' has a hub 19'' providing the stub shaft, which has the spindle 25'' upon which the pinion 26 is mounted. The hub or stub shaft 19'' has a recess 23'' for receiving the hub 24 of the wheel 11.

The foregoing and other means can be used for connecting the pinions with the rear axle of the automobile, as may be found most convenient under the different circumstances.

Having thus described the invention, what is claimed as new is:

1. A tractor attachment for automobiles, comprising a frame for supporting the rear portion of an automobile chassis, an axle journaled to said frame and having crank arms, traction wheels journaled to said crank arms, gears attached to said traction wheels, pinions adapted to mesh with said gears and to be attached to the rear axle of said chassis, and means for holding said axle at different positions relative to said frame.

2. A tractor attachment for automobiles, comprising a frame for supporting the rear axle of an automobile chassis, an axle journaled to the rear portion of said frame and having forwardly and upwardly projecting crank arms, said crank arms having outstanding terminals, traction wheels having their hubs journaled on said terminals, means connecting said axle and frame for holding them at different relative positions, internal gears attached to said traction wheels, pinions adapted to mesh with said internal gears, and means for attaching said pinions to the rear axle of said chassis.

In testimony that I claim the foregoing as my own, I have hereto affixed my signature in the presence of two witnesses.

CHARLES L. OLMSTEAD.

Witnesses:
J. F. BELLEW,
GEO. O. LUNDBLAD.

Copies of this patent may be obtained for five cents each, by addressing the "Commissioner of Patents, Washington, D. C."